(12) United States Patent
Goumault et al.

(10) Patent No.: US 11,090,887 B2
(45) Date of Patent: Aug. 17, 2021

(54) SET OF MOLDING ELEMENTS FOR TIRE MOLD

(71) Applicant: COMPAGNIE GENERALE DES ETABLISSEMENTS MICHELIN, Clermont-Ferrand (FR)

(72) Inventors: Pascal Goumault, Clermont-Ferrand (FR); Didier Malin, Clermont-Ferrand (FR)

(73) Assignee: COMPAGNIE GENERALE DES ETABLISSMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/610,964

(22) PCT Filed: Apr. 26, 2018

(86) PCT No.: PCT/FR2018/051060
§ 371 (c)(1),
(2) Date: Nov. 5, 2019

(87) PCT Pub. No.: WO2018/202987
PCT Pub. Date: Nov. 8, 2018

(65) Prior Publication Data
US 2020/0101683 A1   Apr. 2, 2020

(30) Foreign Application Priority Data

May 5, 2017 (FR) ...................................... 1770458

(51) Int. Cl.
*B29D 30/06* (2006.01)
*B29C 33/42* (2006.01)

(52) U.S. Cl.
CPC .......... *B29D 30/0606* (2013.01); *B29C 33/42* (2013.01); *B29D 2030/0613* (2013.01)

(58) Field of Classification Search
CPC ........ B29D 30/0606; B29D 2030/0613; B29C 33/3842
See application file for complete search history.

(56) References Cited

U.S. PATENT DOCUMENTS 8,449,278 B2   5/2013   Dusseaux et al.
9,022,083 B2 * 5/2015   Voss ................... B60C 11/0306
                                          152/209.18
(Continued)

FOREIGN PATENT DOCUMENTS

CN   102149548 A   8/2011
EP      858875    *   8/1998
(Continued)

OTHER PUBLICATIONS

International Search Report dated Jun. 6, 2018, in corresponding PCT/FR2018/051060 (6 pages).

Primary Examiner — James P Mackey
(74) Attorney, Agent, or Firm — Venable LLP

(57) ABSTRACT

A set of moulding elements, designed to be inserted into a mould for moulding a tyre, comprises: at least one first moulding element (1) and one second moulding element, each moulding element extending in a main moulding-element direction (EM) between two ends (3) of the moulding element with one of the ends (3) of the first moulding element connecting to one of the ends (3) of the second moulding element along an axis (MA), which is substantially perpendicular to the main moulding-element axis (EM).

7 Claims, 2 Drawing Sheets

(56) References Cited

U.S. PATENT DOCUMENTS

| | | | |
|---|---|---|---|
| 9,205,613 B2 * | 12/2015 | Montbel | B29D 30/0606 |
| 10,315,339 B2 * | 6/2019 | Jenkins | B29C 33/302 |
| 10,773,556 B2 * | 9/2020 | Lawson | B60C 11/1204 |
| 2010/0078107 A1 * | 4/2010 | Bonhomme | B60C 11/12 152/209.25 |
| 2011/0304082 A1 | 12/2011 | Dusseaux et al. | |
| 2017/0203365 A1 | 7/2017 | Pays et al. | |
| 2018/0147748 A1 | 5/2018 | Jenkins et al. | |
| 2018/0162016 A1 * | 6/2018 | Reeb | B29C 33/3842 |

FOREIGN PATENT DOCUMENTS

| | | |
|---|---|---|
| FR | 2 759 321 A1 | 8/1998 |
| FR | 2939712 A1 | 6/2010 |
| FR | 3 024 060 A1 | 1/2016 |
| JP | 3-90317 * | 4/1991 |
| JP | 11-58386 A | 3/1999 |
| WO | 2015/086974 A1 | 6/2015 |
| WO | 2016/200392 A1 | 12/2016 |

\* cited by examiner

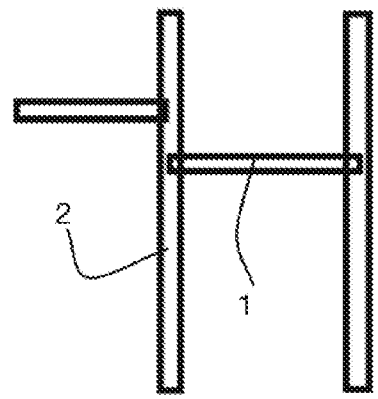
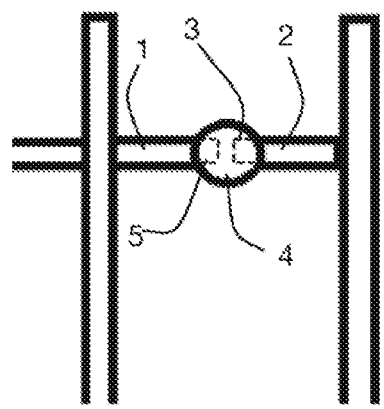
Figure 1
prior art
Figure 2
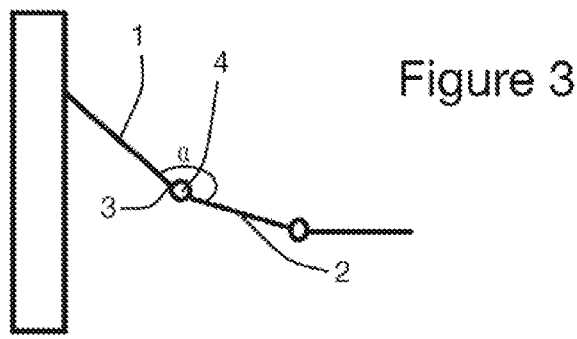
Figure 3
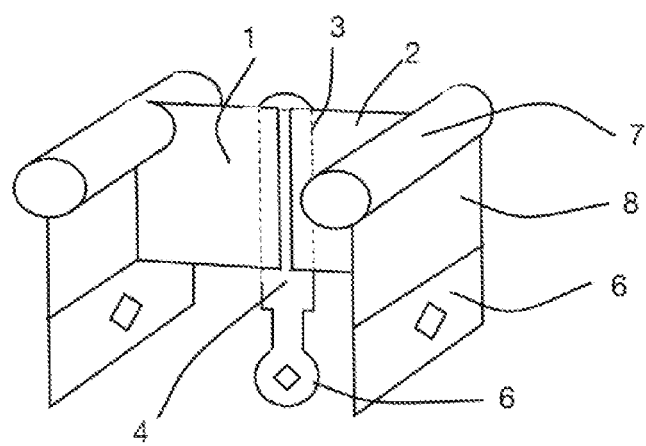
Figure 4

SET OF MOLDING ELEMENTS FOR TIRE MOLD

TECHNICAL FIELD OF THE INVENTION

The present invention relates to a moulding element for moulding a cut in a tread of a tyre. The invention also relates to a set of moulding elements forming a network of moulding elements in a mould.

PRIOR ART

The document FR2939712 discloses a set of moulding elements forming a network. The moulding elements, in this case strips or sipe blades, are produced integrally by laser sintering. These moulding elements make it possible mould cuts in a tread of a tyre.

The network formed by the moulding elements may have a large size. Under certain manufacturing conditions, this network may be subjected to non-negligible deformations, causing it to depart from acceptable manufacturing tolerances. In addition, in order to manufacture such a network, it is necessary to provide a suitable laser sintering machine and more particularly a plate for receiving the large-size network, thereby increasing the manufacturing costs. Moreover, when a moulding element of the network is non-compliant, the whole network has to be scrapped.

The application WO2016/200392 describes a set of moulding elements designed for insertion into a tyre mould, the set comprising longitudinal and transverse sipe blades, the latter being fastened on either side of the longitudinal sipe blades by insertion into enlarged portions of said longitudinal sipe blades. Such an architecture makes it possible to assemble the transverse sipe blades when the longitudinal sipe blades are provided with enlarged portions. However, such enlarged portions have a significant impact on the shape and function of the cuts in the tread of the tyre. If such an enlarged portion is not desired, it then becomes impossible to fasten the transverse sipe blades.

Therefore, there is a need to find a solution that makes it possible to obtain a set of moulding elements within desired manufacturing tolerances, which provides a high level of flexibility in the organization of the moulding elements with respect to one another.

SUMMARY OF THE INVENTION

The invention relates to a moulding element for moulding a cut in a tread of a tyre. The moulding element has an assembly means, this assembly means being able to connect this moulding element to another moulding element in order to form a set of moulding elements.

The invention provides a set of moulding elements designed to be inserted into a mould for moulding a tyre, said set of moulding elements comprising:

at least one first moulding element and one second moulding element, each moulding element extending in a main moulding-element direction (EM) between two ends of said moulding element;

and an assembly means designed for joining one of the ends of the first moulding element to one of the ends of the second moulding element by insertion into at least one notch provided in the assembly means, said assembly means extending along a main assembly-means axis (MA), the main assembly-means axis (MA) being substantially perpendicular to the main moulding-element axis (EM), the height (HMA) of the assembly means being at least equal to 30% of the height (HEM) of the moulding element, and preferably at least 50% of the height (HEM) of the moulding element.

This set of moulding elements is intended to be fitted in a mould. The assembly means make it easier to produce pre-assemblies before placement in a mould. The assemblies provide multiple possibilities for positioning the moulding elements opposite one another whatever the shape of the main moulding element. Generally, the assembly means forms an assembly module into which portions of moulding elements to be assembled are inserted, preferably tightly, so as to obtain a good hold.

The interlocking between the moulding elements makes it possible to ensure the good mechanical integrity thereof during the curing of the tyre. In addition, the set of moulding elements having different moulding elements interlocked in this way is more robust. Moreover, the different moulding elements can be produced by laser sintering, making it possible to obtain very complex moulding element shapes. In a variant, only part of a moulding element of the set of moulding elements is produced by laser sintering, for example a geometrically complex part of this moulding element. It will be noted that the set of moulding elements having the mutually assembled elements can be fastened directly in a mould, for example by adhesive bonding. In a variant, the moulding elements of the set of moulding elements may be "embedded" together in aluminium, before the set of moulding elements are placed in the mould.

In one non-limiting embodiment, the assembly means is in the substantially radial direction. This orientation makes it possible to provide a housing, for example a notch or slot or the like, the extends over the entire height or at least over a long portion of the end of the moulding element to be assembled. This improves the rigidity of the assembly of the moulding elements.

According to an advantageous variant, the slot has a width less than or equal to 1 mm.

Advantageously, the assembly means is independent and fitted between the two moulding elements. This arrangement makes it possible to produce assemblies in a simple manner, multiplying the combinations of elements to be assembled.

The term "independent" means an assembly means without a sipe blade, having a single function of assembling two or more adjacent moulding elements.

Advantageously, the moulding element is a sipe blade.

According to an advantageous embodiment, the second moulding element extends the first moulding element, forming a non-zero angle α.

According to another embodiment, the assembly means is formed integrally with one of the moulding elements. This arrangement makes it possible to simplify the assemblies while increasing the mechanical integrity.

According to an advantageous variant, the assembly means comprises a plurality of notches distributed around its perimeter and forms an assembly node for a number of moulding elements greater than two. This variant is particularly advantageous for making it possible to connect a plurality of moulding elements in a simple manner from a single point of convergence. Thus, as many notches as moulding elements to be assembled are provided. The orientations of the notches may vary depending on the arrangements to be formed.

The assembly means may have a substantially circumferential cross section, or a cross section that is substantially square or rectangular with a notch preferably at the point.

According to an advantageous embodiment, at least one of the moulding elements has an end in the form of a point suitable for insertion into a notch of the assembly means.

According to another variant, at least one notch of the assembly means is discontinuous over the height H.

According to yet another variant, the depth of the notch varies depending on the height H.

The invention also provides a mould for moulding tyres, having at least one set of moulding elements as described above.

BRIEF DESCRIPTION OF THE FIGURES

All the embodiment details are given in the following description, which is supplemented by FIGS. 1 to 10, which are given solely by way of non-limiting examples and in which:

FIG. 1 is a schematic depiction, seen from above, of an example of a set of moulding elements assembled according to a known technique;

FIG. 2 is a schematic depiction, seen from above, of a first example of a set of moulding elements assembled according to the invention;

FIG. 3 illustrates an embodiment variant of the set of moulding elements in FIG. 2;

FIG. 4 is a perspective view of another example of a set of assembled moulding elements;

DETAILED DESCRIPTION OF THE INVENTION

Definitions

Figure 5:
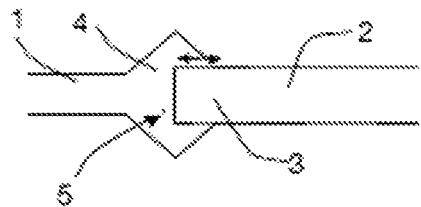
FIGS. 5 to 7 are schematic depictions, seen from above, of examples of assembly modules.

A "tyre" means all types of resilient tread, whether or not it is subjected to an internal pressure.

The "tread" of a tyre means a quantity of rubber material delimited by lateral surfaces and by two main surfaces, one of which is intended to come into contact with a road surface when the tyre is being driven on and the other of which is oriented towards the inside of the tyre.

A "cut in a tread" means either a thin cut, also known as a sipe, or a wide cut, also known as a groove.

A "moulding element" means an element disposed in a mould that is able to make cuts in the tread of a tyre. A moulding element that is able to make a sipe in the tread is known as a sipe blade. A moulding element that is able to make a groove in the tread is known as a strip.

The "anchoring zone of a moulding element" means the portion of the set of moulding elements that is located in the mass of the mould when the latter is employed.

The "moulding zone of a moulding element" means the portion of the moulding element that is located outside the mass of the mould when the latter is employed, and serves to mould the cuts in the tread of the tyre.

A "radial direction" means a direction corresponding substantially to the orientation of the radius of a wheel on which a tyre moulded with the device according to the invention would be mounted.

In the following description, elements which are substantially identical or similar will be denoted by identical references.

FIG. 1 illustrates an example of an assembly of moulding elements according to the prior art. Such an assembly of mutually perpendicular elements has numerous limitations. Moreover, it is more restrictive to produce assemblies with elements aligned opposite one another as in the example in FIG. 2. It is also more restrictive to produce assemblies in series, as in the example in FIG. 3.

FIGS. 2 to 4 illustrate a first exemplary embodiment of a set of moulding elements designed to be inserted into a mould for moulding a tyre. During moulding, the moulding elements make it possible to mould cuts in a tread of a tyre.

As illustrated, the set comprises a first moulding element 1 and at least one second moulding element 2, for example mounted in continuation of the first moulding element (with or without an angle alpha between the first and the second moulding element).

The fastening of the first moulding element 1 to the second moulding element 2 is implemented by an assembly means 4 that can have various shapes, as the case may be. Various examples of profiles of assembly means are illustrated in FIGS. 4 to 8, by way of non-limiting examples. The assembly means has a generally elongate profile, with a main assembly-means axis MA, and at least one notch (or slot) 5 oriented substantially parallel to this axis MA.

The moulding elements to be assembled are generally made up of substantially elongate sipe blades extending in a main moulding-element direction EM between two ends 3. The notch 5 is thus arranged substantially perpendicularly to the main moulding-element axis EM, such that an end 3 can easily be inserted into a notch 5.

As illustrated in FIG. 4, the notch 5 is advantageously located in the moulding zone 8 of the moulding element. The profile and the dimensions of the notch 5 are provided so as to allow easy insertion while ensuring a firm hold of the end 3 of the moulding element.

In order to encourage mechanical retention between the parts, the height HMA of the assembly means 4 is at least equal to 30% of the height HEM of the moulding element 1 or 2, and preferably at least 50% of the height HEM of the moulding element.

The assembly can be carried out using various approaches. For example, the assembly means 4 is independent and fitted between the moulding elements to be assembled. This affords a high level of implementation flexibility. According to another approach, the assembly means 4 is formed integrally with one of the moulding elements. The assembly is simpler and the mechanical integrity even more effective.

Figure 9:
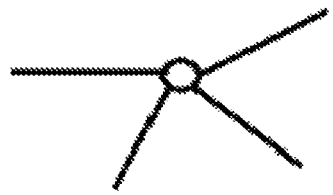
FIG. 9 schematically illustrates an assembly module serving as an assembly intersection for a plurality of moulding elements.

FIG. 9 schematically illustrates an embodiment in which the assembly means 4 comprises a plurality of notches distributed around its perimeter, and thus forms an assembly node for a plurality of moulding elements.

Figure 6:
Figure 7:
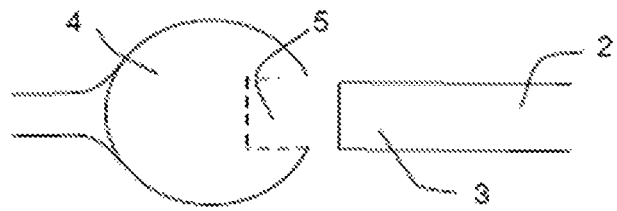
Figure 8:
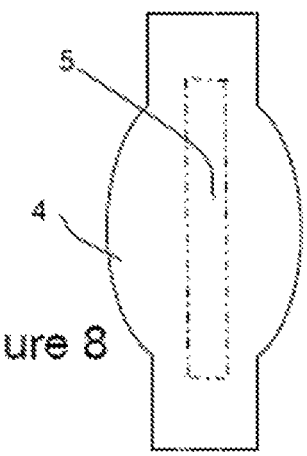
FIG. 8 is a view in elevation of a variant of an assembly means.
Figure 10:
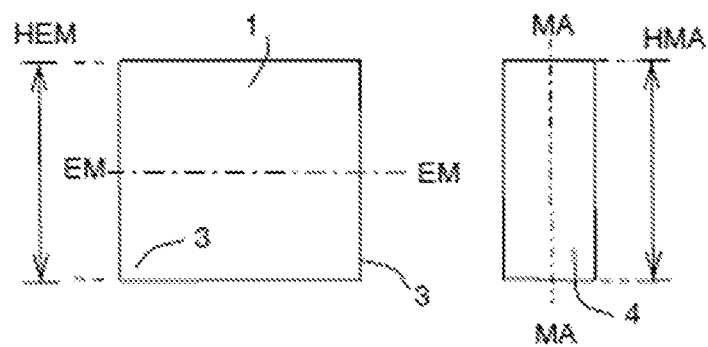
FIG. 10 shows a moulding element with its main axis and an assembly module with its main axis.

FIGS. 5 to 7 schematically illustrate various non-limiting examples of profiles of assembly means. In the exemplary embodiments in FIGS. 5 and 6, the cross section of the assembly means is substantially square or rectangular with the notch 5 preferably at the point. As shown in FIG. 6, one of the moulding elements has a bevelled end 3, very suitable for insertion into a notch 5 of the assembly means 4. In the exemplary embodiment in FIG. 7, the assembly means 4 has a substantially circumferential cross section. The exemplary embodiment of the assembly means in FIG. 8 provides an enlarged zone providing a curved profile oriented in the axial direction.

According to various other embodiment variants that are not illustrated, at least one notch of the assembly means is discontinuous over the height HMA. Furthermore, the depth of the notch may vary depending on the height HMA.

The moulding elements are advantageously manufactured by laser sintering. In a variant, these moulding elements are manufactured by any other manufacturing method, such as casting, machining or the like.

REFERENCE NUMERALS EMPLOYED IN THE FIGURES

1 First moulding element
2 Second moulding element
3 End of moulding element
4 Radial assembly means
5 Assembly means notch
6 Anchoring zone
7 Circumferential assembly tube
8 Moulding zone

The invention claimed is:

1. A set of molding elements designed to be inserted into a mold for molding a tire, the set of molding elements comprising:
   at least one first molding element and one second molding element, each molding element extending in a main molding-element direction between two ends of the molding element; and
   an assembly means designed for joining one of the ends of the first molding element to one of the ends of the second molding element by insertion into at least one notch provided in the assembly means, the assembly means extending along a main assembly-means axis, and the main assembly-means axis being substantially perpendicular to the main molding-element direction,
   wherein a height of the assembly means is at least equal to 30% of a height of the first molding element or the second molding element,
   wherein at least one of the molding elements has a beveled end which inserts into the at least one notch,
   wherein the cross-section of the assembly means is substantially square or rectangular at a location of the at least one notch,
   wherein the assembly means is formed integrally with the first molding element or the second molding element, and
   wherein the at least one notch is at a point of the substantially square or rectangular cross-section of the assembly means.

2. The set of molding elements according to claim 1, wherein the height of the assembly means is at least equal to 50% of the height of the first molding element or the second molding element.

3. The set of molding elements according to claim 1, wherein each of the first molding element and the second molding element is a sipe blade.

4. The set of molding element according to claim 1, wherein the second molding element extends the first molding element, forming a non-zero angle $\alpha$.

5. The set of molding elements according to claim 1, wherein the assembly means comprises a plurality of notches distributed around a perimeter of the assembly means and forms an assembly node for more than two molding elements.

6. The set of molding elements according to claim 1, wherein at least one of the first molding element and the second molding element has an end in a form of a point suitable for insertion into the at least one notch of the assembly means.

7. A mold for molding tires comprising at least one set of molding elements according to claim 1.

* * * * *